United States Patent
Mandler et al.

(10) Patent No.: US 6,745,206 B2
(45) Date of Patent: Jun. 1, 2004

(54) FILE SYSTEM WITH ACCESS AND RETRIEVAL OF XML DOCUMENTS

(75) Inventors: Benjamin Mandler, Zichron Yaakov (IL); Yoelle Maarck-Smadja, Haifa (IL); Alain Azagury, Nesher (IL); Michael Factor, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 09/873,084

(22) Filed: Jun. 4, 2001

(65) Prior Publication Data

US 2001/0049675 A1 Dec. 6, 2001

Related U.S. Application Data

(60) Provisional application No. 60/209,475, filed on Jun. 5, 2000.

(51) Int. Cl.[7] .................................. G00F 17/30
(52) U.S. Cl. .................................. 707/104.1
(58) Field of Search .............. 707/3, 10, 2, 104.1, 707/5; 715/513

(56) References Cited

U.S. PATENT DOCUMENTS

| | | | | |
|---|---|---|---|---|
| 6,366,934 B1 | * | 4/2002 | Cheng et al. | 707/513 |
| 6,421,656 B1 | * | 7/2002 | Cheng et al. | 707/2 |
| 6,510,406 B1 | * | 1/2003 | Marchisio | 704/9 |
| 6,519,597 B1 | * | 2/2003 | Cheng et al. | 707/10 |
| 6,584,459 B1 | * | 6/2003 | Chang et al. | 707/1 |

OTHER PUBLICATIONS

David K. et al., "Semantic File Systems", Proc. 13th ACM Symposium on Operating System Principles, Oct. 1991, pp. 16–25.

Burra Gopal, et al., "Integrating Content–Based Access Mechanisms with Hierarchical File Systems", Operating System Design and Implementation (OSDI), 1999.

Paul Dourish, et al., "Using Properties for Uniform Interaction in the Presto Document System", Proceedings of the 13th Annual ACM Symposium on User Interface Software and Technology, Nov. 1999.

Paul Dourish, et al., "Presto: An Experimental Architecture for Fluid Interactive Document Spaces", ACM Transactions on Computer–Human Interaction 6(2), 1999.

Alain Azagury, et al., "XMLFS: An XML–Aware File System", IBM Research Lab in Haifa, 2000.

* cited by examiner

*Primary Examiner*—Safet Metjahic
*Assistant Examiner*—Sana Al-Hashemi
(74) *Attorney, Agent, or Firm*—McGuireWoods LLP; Daniel Kligler

(57) ABSTRACT

An XML-aware file system exploits attributes encoded in an XML document. The file system presents a dynamic directory structure to the user, and breaks the conventional tight linkage between sets of files and the physical directory structure, thus allowing different users to see files organized in a different fashion. The dynamic structure is based upon content, which is extracted using an inverted index according to attributes and values defined by the XML structure.

47 Claims, 11 Drawing Sheets

| ALL FOLDERS | CONTENTS OF 'F:\' |     |
|---|---|---|
|   | NAME | TYPE |
|   | ▢ _DESC | FILE FOLDER |
|   | ▢ _STAR | FILE FOLDER |
|   | ▢ PROFILE | FILE FOLDER |
|   | ▢ PROFILE2 | FILE FOLDER |

MNT ON 'PS68-35\D\BENNY'[F:]

FIG. 6

| ALL FOLDERS | CONTENTS OF 'F:\PROFILE' | |
|---|---|---|
| | NAME | TYPE |
| | _DESC | FILE FOLDER |
| | _STAR | FILE FOLDER |
| | ADDRESS | FILE FOLDER |
| | BUSINESS-SUMMARY | FILE FOLDER |
| | EMPLOYEES | FILE FOLDER |
| | FAX | FILE FOLDER |
| | NAME | FILE FOLDER |
| | OFFICERS | FILE FOLDER |
| | PHONE | FILE FOLDER |
| | RECENT-EARNING | FILE FOLDER |
| | STATISTICS | FILE FOLDER |
| | TICKER | FILE FOLDER |

[E:]
MNT ON 'PS68-35\D\BENNY'[F:]  — 94
  _DESC
  _STAR
  PROFILE — 102
  PROFILE2

| ALL FOLDERS | CONTENTS OF 'F:\PROFILE\TICKER' | |
|---|---|---|
| | NAME | TYPE |
| 📁 | 📁 ABTL | FILE FOLDER |
| 📁 | 📁 ACS | FILE FOLDER |
| 📁 | 📁 ACXM | FILE FOLDER |
| 📁 | 📁 ADFC | FILE FOLDER |
| 📁 | 📁 ADSC | FILE FOLDER |
| 📁 | 📁 AHTC | FILE FOLDER |
| 📁 | 📁 AHWY | FILE FOLDER |
| [E:] | 📁 AMSY | FILE FOLDER |
| MNT ON 'PS68-35\D\BENNY'[F:] | 📁 NASDAQ | FILE FOLDER |
| 📁 _DESC | 📁 NYSE | FILE FOLDER |
| 📁 _STAR | | |
| 📁 PROFILE —102 | | |
|   📁 _DESC | | |
|   📁 _STAR | | |
|   📁 ADDRESS | | |
|   📁 BUSINESS-SUMMARY | | |
|   📁 EMPLOYEES | | |
|   📁 FAX | | |
|   📁 NAME | | |
|   📁 OFFICERS | | |
|   📁 PHONE | | |
|   📁 RECENT-EARNING | | |
|   📁 STATISTICS | | |
|   📁 TICKER —112 | | |

| ALL FOLDERS | CONTENTS OF 'F:\PROFILE\TICKER\NASDAQ' | |
|---|---|---|
| 📁 <br> 📁 <br> 💿 [E:] <br> 🖥 MNT ON 'PS68-35\D\BENNY'[F:] <br>   📁 _DESC <br>   📁 _STAR <br>   📁 PROFILE <br>     📁 _DESC <br>     📁 _STAR <br>     📁 ADDRESS <br>     📁 BUSINESS-SUMMARY <br>     📁 EMPLOYEES <br>     📁 FAX <br>     📁 NAME <br>     📁 OFFICERS <br>     📁 PHONE <br>     📁 RECENT-EARNING <br>     📁 STATISTICS <br>     📁 TICKER ~112 <br>       📁 ABTL <br>       📁 ACS <br>       📁 ACXM <br>       📁 ADFC <br>       📁 ADSC <br>       📁 AHTC <br>       📁 AHWY <br>       📁 AMSY <br>       📁 NASDAQ <br>       📁 NYSE ~122 | NAME | TYPE |
| | 📁 AND  ~132 | |
| | 📄 A-ABTL | XML DOCUMENT |
| | 📄 A-ACXM | XML DOCUMENT |
| | 📄 A-ADFC | XML DOCUMENT |
| | 📄 A-ADSC | XML DOCUMENT |
| | 📄 A-AHTC | XML DOCUMENT |
| | 📄 A-AHWY | XML DOCUMENT |
| | 📄 A-AMSY | XML DOCUMENT |

```
<!DOCTYPE PROFILE SYSTEM "/D:/BENNY/XMLFS/FILES/PROFILE.DTD">
<PROFILE>
    <NAME> AUTOBYTEL.COM, INC. </NAME>
    <TICKER> NASDAQ: ABTL </TICKER>          136
    <ADDRESS>
        <STREET>10072 MACARTHUR BOULEVARD</STREET>
        <CITY>IRVINE</CITY>
        <ZIP>CA 92612</ZIP>
    </ADDRESS>
    <PHONE> (949) 225-4500</PHONE>
    <FAX> (949) 225-4541</FAX>
    <EMPLOYEES> 100</EMPLOYEES>
    <OFFICERS>
        <OFFICER NAME="MICHAEL FUCHS, " TITLE="CHMN."/>
        <OFFICER NAME="MARK W. LORIMER, " TITLE="PRES./CEO"/>
        <OFFICER NAME="ANN M. DELLIGATTA, " TITLE="EXEC.VP/COO"/>
        <OFFICER NAME="HOSHI PRINTER, " TITLE="SR.VP/CFO"/>
        <OFFICER NAME="ROBERT S. GRIMES, " TITLE="EXEC.VP"/>
        <OFFICER NAME="ARIEL AMIR, " TITLE="COUNSEL/VP"/>
    </OFFICERS>
    <BUSINESS-SUMMARY>
    AUTOBYTEL.COM, INC. IS A BRANDED INTERNET SITE FOR NEW AND
    USED VEHICLE INFORMATION AND PURCHASING
    </BUSINESS-SUMMARY>
    <RECENT-EARNING>

</RECENT-EARNING>
    <STATISTICS>
    <PRICEANDVOLUME UPDATED=" JULY 16, 1999">
    <PRICE TYPE="52-WEEK-LOW">14.125</PRICE>
    <PRICE TYPE="RECENT">20.875</PRICE>
    <PRICE TYPE="52-WEEK-HIGH">58.00</PRICE>
    <BETA>  </BETA>
```

FIG. 10

FILE SYSTEM WITH ACCESS AND RETRIEVAL OF XML DOCUMENTS

CROSS-REFERENCE TO RELATED APPLICATIONS

This application claims the benefit of Provisional Application No. 60/209,475, filed Jun. 5, 2000.

BACKGROUND OF THE INVENTION

1. Field of the Invention

This invention relates to computer file systems. More particularly this invention relates to an improved semantically based system for dynamically organizing XML files or files with markup tags in a context sensitive manner.

2. Description of the Related Art

It has been recognized that static, hierarchical systems of organizing documents are inadequate to efficiently meet the needs of computer users attempting to access increasingly vast amounts of dynamically changing information. Conventional file systems are simply too unwieldy to deal with this information load in a way that is convenient to the user. They have become increasingly impractical for efficient document management.

A relational database is an alternative to a file system as a repository for documents, and many databases today provide some support for documents such as extended markup language (XML) documents. The XML document type declaration contains, or points to, markup declarations that provide a grammar for a class of documents. This grammar is known as a document type definition (DTD) However, the flexible document type declaration of an XML document, while easily represented as a graph, does not map naturally or efficiently into a flat static table. Moreover, the standard query language (SQL) interface of databases is not as commonly used in software applications, as is the conventional file system interface. Furthermore, management of large databases often requires a skilled administrator.

This approach to controlling the information explosion involves attaching metadata to documents. For example, using the MPEG-7 standard it is possible to attach attributes to video data.

It is proposed in the document *Semantic File Systems*. D. Gifford, P. Jouvelot, M. Sheldon, and J. O'Toole Jr., *In Proc. 13th ACM Symposium on Operating Systems Principles*, October 1991, pp. 16–25, to provide access to documents using queries. Virtual directories are created, each pointing to files that satisfy a query. The concepts presented in this document provide a foundation for the invention disclosed herein.

The document Presto: *An Experimental Architecture for Fluid Interactive Document Spaces*, Paul Dourish, W. Keith Edwards, Anthony LaMarca, and Michael Salisbury, ACM Transactions on Computer-Human Interaction, 6(2) 1999, and the document *Using Properties for Uniform Interaction in the Presto Document System*, Paul Dourish, W. Keith Edwards, Anthony LaMarca, and Michael Salisbury, in Proceedings of the ACM Symposium on User Interface Software and Technology, UIST '99, Asheville, N.C., 1999, together disclose a document management system that emphasizes the attributes of documents being retrieved, while retaining some structural aspects of conventional file systems. The system is driven by attributes that are manually attached to the files, or extracted from the files using a filter. The attributes, including content, may be arbitrarily defined by different users and their numbers extended, such that different users have entirely different view of the document space. This arrangement has the drawbacks of requiring the user to execute a separate application using a separate interface.

Another approach is taken in the document, *Integrating Content-Based Access Mechanisms with Hierarchical File Systems*, B. Gopal and U. Manber, Operating Systems Design and Implementation (OSDI), 1999. This document proposes to extend the file system interface, wherein users are able to create their own name spaces based on queries, path names, or combinations thereof. This approach has a drawback in that interoperability with existing applications is difficult.

SUMMARY OF THE INVENTION

It is a primary advantage of some aspects of the present invention that existing applications using the conventional file system applications programming interface (API) are supported.

It is still another advantage of some aspects of the invention that file organization dynamically accommodates changes in the document space.

If is a further advantage of some aspects of the invention that different users may see files organized in a different fashion, and that a given user is able to see the files organized in different ways.

It is yet another advantage of some aspects of the invention that a user can quickly determine what information is contained in a repository of files in a given context.

These and other advantages of the present invention are attained by a file system, which in a preferred embodiment exploits attributes encoded in an XML document. The file system presents a dynamic directory structure to the user, and breaks the conventional tight linkage between sets of files and the physical directory structure, thus allowing different users to see files organized in a different fashion. The dynamic structure is based upon content, which is extracted according to attributes defined by the XML structure.

In a preferred embodiment of the invention, an XML-aware file system (XMLFS) combines the interface of a conventional file system with the organizational power of information retrieval to provide a repository for XML documents. It provides a solution for organizing, searching and browsing collections of XML documents. The semi-structured nature of documents that comply with the XML standard implies that XML documents readily include metadata. Because of its popularity, XML appears to be an ideal format for innovation that results in sensibly ordering an ever-growing amount of information.

To the user, the XML-aware file system appears to be a completely conventional standard file system, and it supports any existing application that employs a standard file system applications programming interface. In addition, in some embodiments, since the XML-aware file system is built upon an existing file system, it can exploit existing support facilities, for example backup facilities.

In an important departure from the view presented by traditional hierarchical file systems, instead of showing files organized in a static directory structure, the XML-aware file system shows files organized in a dynamic hierarchy which is constructed on-the-fly. The user of the XML-aware file system is informed by the directory path as to what content is relevant at a particular instance in time. A directory path in the XML-aware file system is a sequence of attributes and values, and the contents of a directory are all of the XML documents that have the attributes and values named in the path. In other words, a directory path in the XML-aware file system reflects a query for a set of documents matching a set of constraints. As the path is being incrementally constructed, the user of the file system browses through a set of documents that match a partial query.

The invention provides a computer implemented method of information retrieval, including the steps of retrieving structural information of memorized XML documents according to a document type declaration that corresponds to each of the documents, retrieving elements of the documents, attributes and values of the elements. The method further includes generating a multilevel inverted index from the structural information, the elements, the attributes and the values, and accepting a specification from a user that has members comprising at least one of the elements, the attributes or the values. The method further includes extracting data from the index responsive to the specification, wherein the data complies with at least one of the members. The method further includes displaying virtual directory paths of corresponding ones of the documents, wherein the directory paths each comprise a sequence of the members, and wherein contents of directories that are identified in the directory paths comprise selected ones of the documents possessing the specification.

According to an aspect of the method, the index includes a structural section that has postings of the structural information, and a words section that has postings of the values, wherein the values are words.

One aspect of the method includes arranging the directory paths in a hierarchy that is constructed in conformance with the specification. Arranging can be accomplished by extracting a document identifier from one of the postings of the values, extracting an offset of a context from the one of the postings of the values, and extracting an entry length of the context from the one of the postings of the values.

According to one aspect of the method, the documents are written in a markup language.

According to still another aspect of the method, the documents are XML documents.

An additional aspect of the method includes noting changes in a composition of a repository of the documents, and updating the index responsive to the changes.

According to another aspect of the method, the specification includes a partial query and a complete query.

According to yet another aspect of the method, a portion of the specification is stated as a path name by the user.

The invention provides a computer software product, including a computer-readable medium in which computer program instructions are stored, which instructions, when read by a computer, cause the computer to perform the steps of retrieving structural information of memorized documents according to a document type declaration that corresponds to each of the documents, retrieving elements, attributes and values of the elements, generating a multilevel inverted index from the structural information, the elements, the attributes and the values, and accepting a specification from a user that comprises at least one of the elements, the attributes and the values. Responsive to the specification the computer further performs the steps of extracting data from the index, associating the data with corresponding ones of the documents, and displaying the corresponding ones of the documents as virtual directory paths, wherein the directory paths each comprise a sequence of elements, the attributes and the values, and wherein contents of directories that are identified in the directory paths comprise selected ones of the documents possessing the specification.

According to an aspect of the computer software product, the index includes a structural section that has postings of the structural information, and a words section that has postings of the values, wherein the values are words.

An additional aspect of the computer software product includes arranging the directory paths in a hierarchy that is constructed in conformance with the specification. Arranging the directory paths can include extracting a document identifier from one of the postings of the values, extracting an offset of a context from the one of the postings of the values, and extracting an entry length of the context from the one of the postings of the values.

According to one aspect of the computer software product, the documents are written in a markup language.

According to another aspect of the computer software product, the documents are XML documents.

A further aspect of the computer software product includes noting changes in a composition of a repository of the documents, and updating the index responsive to the changes.

According to yet another aspect of the computer software product, the specification includes a partial query and a complete query.

According to still another aspect of the computer software product, the specification is stated as a path name by the user.

According to one aspect of the computer software product, the specification is issued via a file system applications programming interface.

According to another aspect of the computer software product, the instructions define a file system engine that issues calls to an operating system.

The invention provides a computer implemented information retrieval system for presenting a semantically dependent directory structure of XML files to a user, including a file system engine that receives a file request via a file system application programming interface and issues file system calls to an operating system, wherein the file request specifies a file content of memorized files. The system also includes an XML parser linked to the file system engine that retrieves structural information of XML documents, the XML parser further retrieving at least one of elements, attributes and respective values thereof from the XML documents. The system also includes an indexer linked to the XML parser for constructing an inverted index of the elements, the attributes and the respective values thereof, wherein responsive to the file request, the file system engine retrieves postings of the inverted index that satisfy requirements of the file request, and returns directory paths to the file system application programming interface of selected ones of the XML documents corresponding to the postings.

According to an aspect of the information retrieval system, the inverted index includes a structural section that has postings of the structural information, and a words section that has postings of words of the XML documents.

According to yet another aspect of the information retrieval system, the postings of the structural information and the postings of words comprise a document identifier of one of the XML documents, an offset of a context in the one XML document, and an entry length in the context of the one XML document.

Still another aspect of the information retrieval system includes an XML analyzer for updating the inverted index, wherein the XML analyzer analyzes additions to the memorized files.

According to an additional aspect of the information retrieval system, the XML parser retrieves the structural information from document type declarations of the XML documents.

According to one aspect of the information retrieval system, the file request includes a partial query and a complete query.

According to another aspect of the information retrieval system, a portion of the file request is a path name.

According to a further aspect of the information retrieval system, the repository of the XML documents can be a networked file system.

The invention provides a computer implemented information retrieval system for presenting a semantically dependent directory structure of document files to a user, wherein documents of the document files are written in a markup language, including a file system engine that receives a file request via a file system application programming interface and issues file system calls to an operating system, wherein the file request specifies a file content of memorized files. The system includes a parser of the markup language, linked to the file system engine, that retrieves structural information of the documents, the parser further retrieving at least one of elements, attributes and respective values thereof from the documents. The system includes an indexer, linked to the parser, for constructing an inverted index of the elements and the attributes and the respective values thereof, wherein responsive to the file request, the file system engine retrieves postings of the inverted index that satisfy requirements of the file request, and returns directory paths to the file system application programming interface of selected ones of the documents corresponding to the postings.

According to an aspect of the information retrieval system, the inverted index includes a structural section that has postings of the structural information, and a words section that has postings of words of the documents.

According to one aspect of the information retrieval system, the postings of the structural information and the postings of words include a document identifier of one of the documents, an offset of a context in the one document, and an entry length of the context in the one document.

Another aspect of the information retrieval system includes an analyzer for updating the inverted index, wherein the analyzer analyzes additions to the memorized files.

According to a further aspect of the information retrieval system, the parser retrieves the structural information from document type declarations of the documents.

According to yet another aspect of the information retrieval system, the file request includes a partial query and a complete query.

According to still another aspect of the information retrieval system, a portion of the file request is a path name.

According to an additional aspect of the information retrieval system, a repository of the documents can be a networked file system.

BRIEF DESCRIPTION OF THE DRAWINGS

For a better understanding of these and other objects of the present invention, reference is made to the detailed description of the invention, by way of example, which is to be read in conjunction with the following drawings, wherein:

FIG. 6 is a representation of a computer monitor screen display;

FIG. 7 is a representation of a computer monitor screen display;

FIG. 8 is a representation of a computer monitor screen display;

FIG. 9 is a representation of a computer monitor screen display; and

FIG. 10 is a representation of a computer monitor screen display.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well-known circuits, control logic, and the details of computer program instructions for conventional algorithms and processes have not been shown in detail in order not to unnecessarily obscure the present invention. Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein.

While the teachings of the invention are disclosed with reference to an XML-aware file system, the invention is not limited to XML documents. It can be applied to documents written in other markup languages. The teachings herein can be applied to any sort of database—mail combination, for example Lotus Notes®, and not necessarily in a file system. The file system is the currently preferred embodiment, as it is universally familiar and is known to be an interoperable repository for storing documents. Almost all applications work with a file system interface. In addition, there is a large set of support facilities for file systems, e.g., backup, and security utilities. Moreover, there are numerous applications written for the file system applications programming interface. Those applications can operate with the present invention without any modifications whatsoever.

Figure 1:
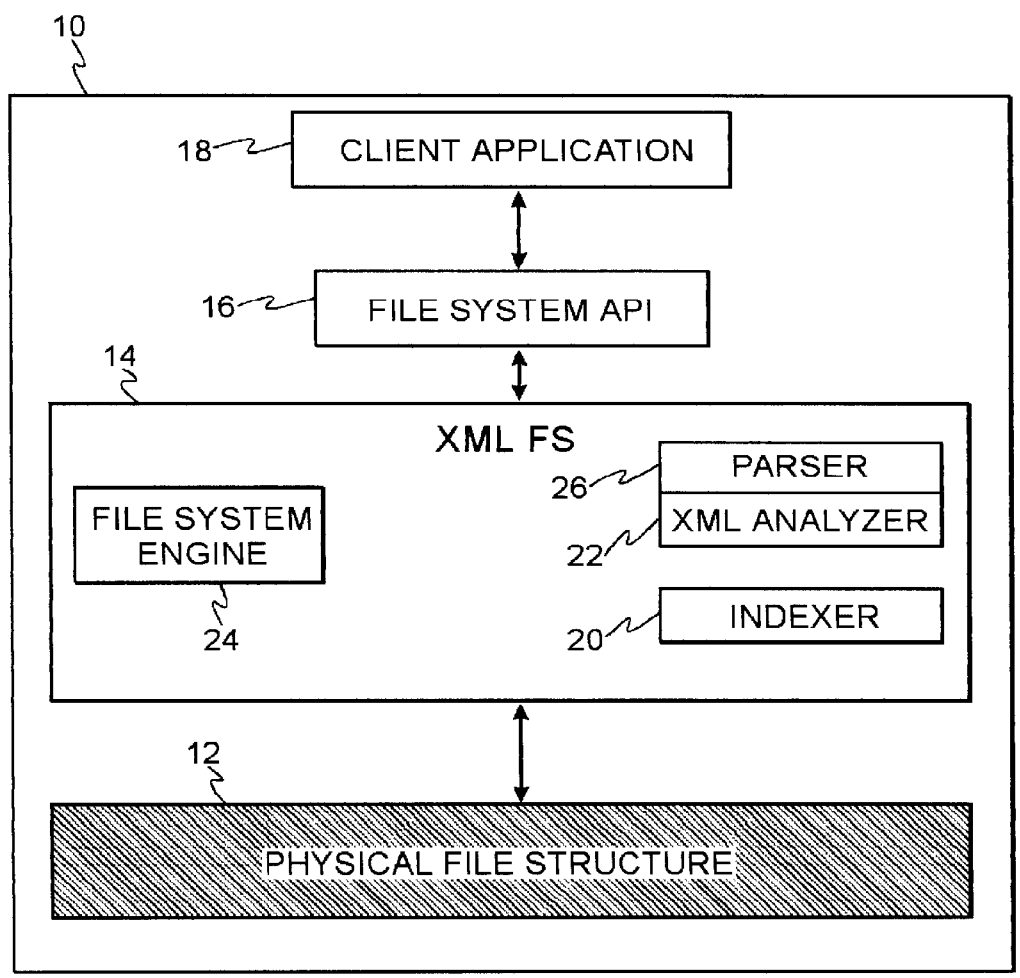
FIG. 1 is a block diagram of an XML-aware file system according to a preferred embodiment of the invention.

Turning now to the drawings, reference is made to FIG. 1, which displays a high level block diagram of an XML-aware file system, which is constructed and operative in accordance with a preferred embodiment of the invention. An arrangement 10 allows a computer user to access stored data. In the arrangement 10, there is a basic underlying physical file structure 12, which is conventional. The file structure 12 can be realized by a physical file system. An XML-aware file system 14 forms a functional layer between the file structure 12 and the file system applications programming interface 16 that is seen by a user application 18. Shielded by the file system applications programming interface 16, the XML-aware file system 14 presents itself to the outside world in a completely standard fashion.

The XML-aware file system 14 has several components that cooperate to provide a file system applications programming interface for accessing files in a context-sensitive manner. These components include an indexer 20, an XML analyzer 22, and a file system engine 24.

The indexer 20 produces a multilevel inverted index that can support several kinds of queries. Queries that are supported include supplying all valid values in a given context, including child elements, attributes, and actual values from the files stored in the repository. An example of this type of query is, "Supply all possible values of the context /profile/name". In other words, supply all child elements and attributes of the element "name", and all the values of this element from the files themselves.

Another supported query is a request to supply all files which have a particular value in a given context. An example is the query, "Supply all the files which have the word INC in the context /profile/name".

The conjunction of several queries is supported, for example the query "/profile/name/INC/and/profile/ticker". This query will supply all valid values in the context /profile/ticker from all the files which have the word INC in their /profile/name element.

The XML analyzer 22 is responsible for updating the index created by the indexer 20 when newer files appear. The file system engine 24 implements basic file system functions, and may do this by building upon an existing file system, for example by issuing basic file system calls to the operating system. A main difference of the file system engine 24, as compared with a conventional file system engine, is the consultation of the indexer 20 when information about the directory structure is required. This occurs, for example, when reading, or traversing directories. The file system engine 24 receives instructions from the file system applications programming interface 16. It then passes a directory path to the indexer 20, which interprets the path as a query. The indexer 20 returns information which enables the file system engine 24 to respond to the file system applications programming interface 16 as if a conventional directory were accessed.

The XML-aware file system 14 adapts the concept of semantic file systems, which is proposed in the above noted document, Semantic File Systems, and uses it in combination with information retrieval techniques in the context of XML documents. Semantic file systems attempt to gather underlying semantics of the files, and present the files to the users in virtual directories that are organized according to the file semantics in order to ease navigation. The XML-aware file system 14 exploits the file content to derive metadata, which is, needed in order to automatically and semantically organize the files. In order to derive the metadata, each file that is added to the file structure 12 has to be parsed in order to retrieve meaningful information that makes the search functions and browse functions of an XML document repository possible. The XML-aware file system 14 uses an XML-parser 26, which is associated with the XML analyzer 22. The XML-parser 26 retrieves the underlying structural information of an XML document, as well as individual elements and attributes, together with their respective values. A conventional IBM parser, XML4J, is suitable. This structural information, which is an integral part of the document according to well-known XML specifications, is used by the indexer 20 to construct an inverted index that supports automatic meaningful organization of documents by content. This process is completely automatic and transparent to the user.

In the currently preferred embodiment, the components of the XML-aware file system 14 are written in Java. However, many programming languages could be equally applied. A prototype system currently operates under the Microsoft Windows® Operating System.

Figure 2:
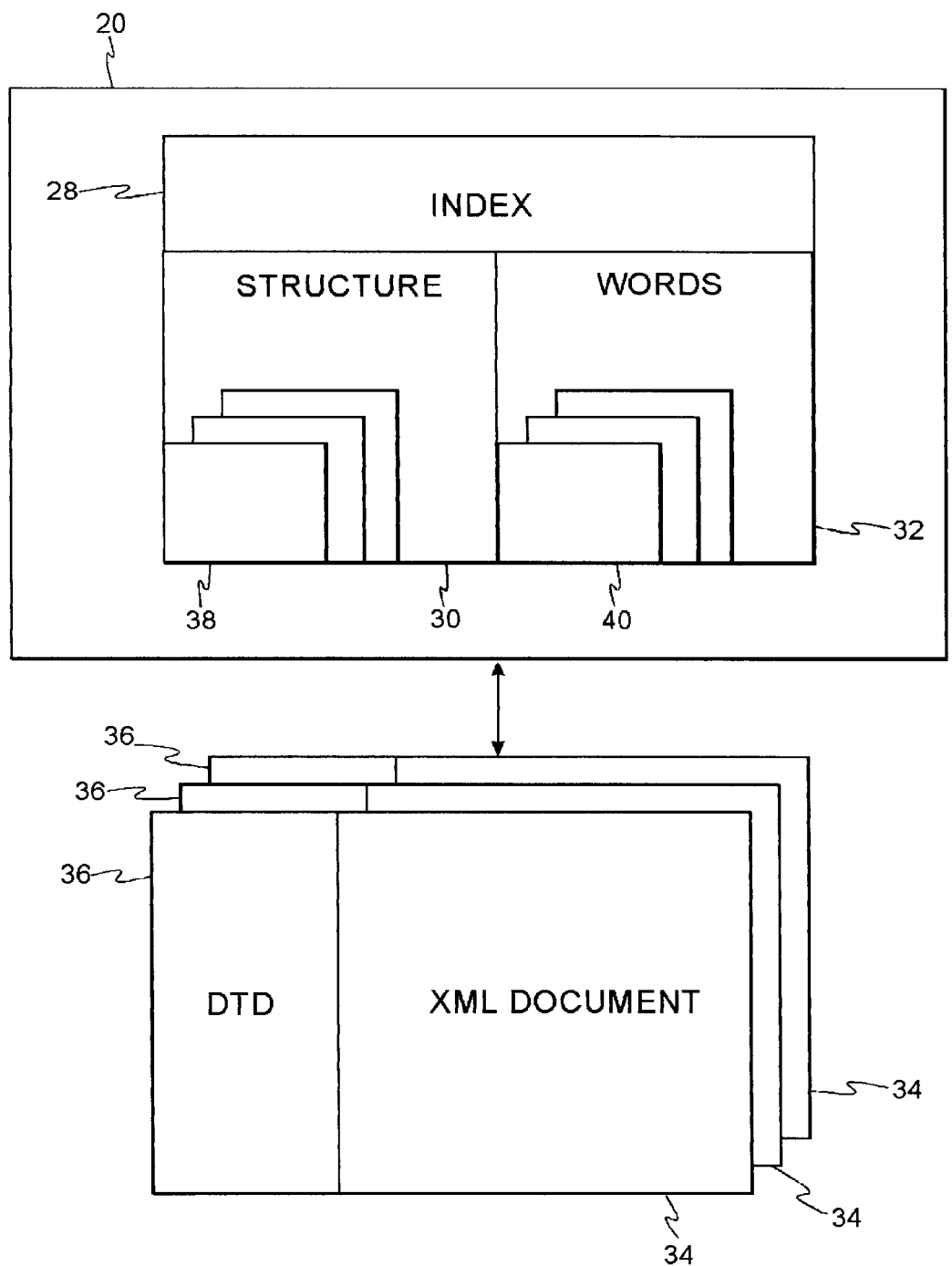
FIG. 2 is a block diagram illustrating aspects of an indexer that is used in the file system shown in FIG. 1.

Reference is now made to FIG. 2, which illustrates aspects of the indexer 20 in further detail. The description of FIG. 2 is to be read in conjunction with FIG. 1. The indexer 20 operates on a multilevel inverted index 28. The index 28 consists of two main portions, a structural section 30, and a words section 32. The structural section 30 is compliant with each underlying structure of each document 34 being indexed, as dictated by its respective DTD 36, and the words section 32 keeps track of all the words which appear as values in each of the documents 34. The structural section 30 maintains a list of postings 38 for each element of the document 34, and the words section 32 maintains a list of postings 40. The postings 38, 40 include a file identification, offset and length, and are accessed from the index 28 when preparing responses to relevant queries.

A new entry in the structural section 30 is created only once for each different DTD encountered during the indexing process. When other documents having the same DTD are presented to the indexer 20, they merely result in an update of existing entries and postings within the relevant portion of the structural section 30 and the accompanying actual values in the words section 32.

Figure 3:
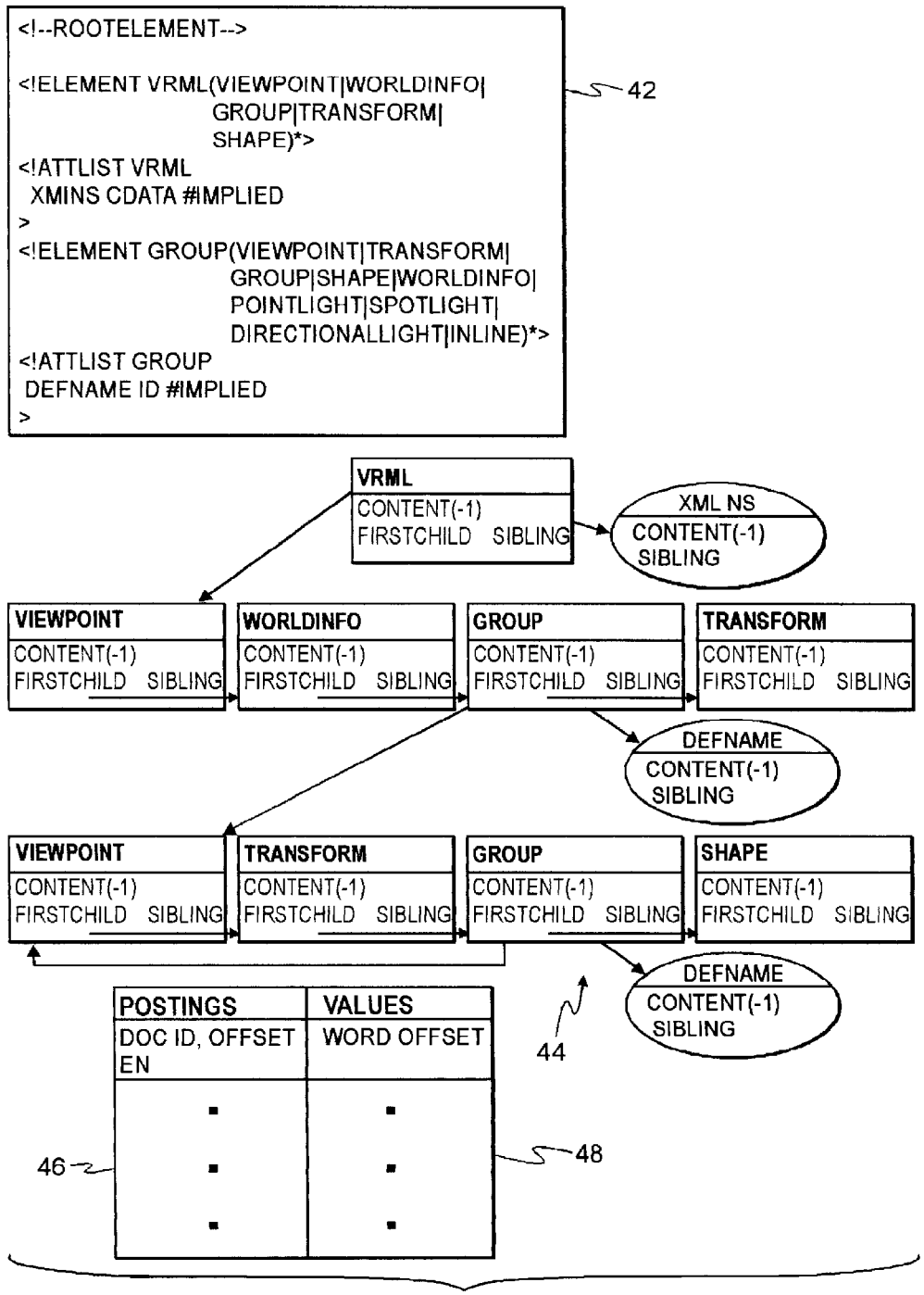
FIG. 3 is a composite diagram that illustrates a simple example of a DTD and a portion of its corresponding structure index.

Reference is now made to FIG. 3, which is a composite diagram that illustrates a simple example of a DTD and a portion of its corresponding structure index. The description of FIG. 3 is to be read in conjunction with FIG. 2. The DTD 42 is shown on the upper portion of FIG. 3. The structure index 44 is indicated on the lower portion of the figure. In the structure index 44 elements are indicated by rectangles, and attributes are represented by ellipses. Postings and values lists are shown representatively by the list 46 and the list 48 respectively. Postings and values lists are associated with each element and attribute in the structure index 44.

Figure 4:
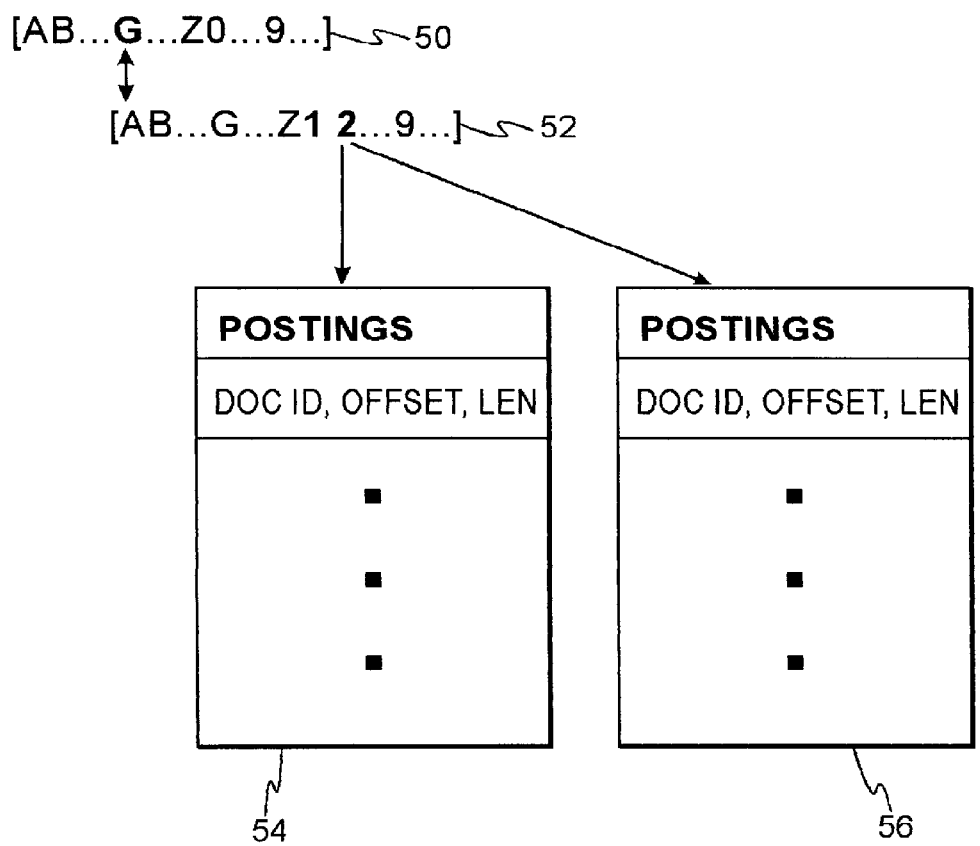
FIG. 4 is a diagram illustrating an example of a words index.

Reference is now made to FIG. 4, which illustrates an example of the index in the words section 32 in further detail. The description of FIG. 4 is to be read in conjunction with FIG. 2. The bracketed list 50 and the bracketed list 52 are a portion of a words index that represents the words g1 and g2. In a response to a file addition that includes the words g1 and g2, data extracted from the index that includes the lists 50, 52 would flow to the postings 54, 56, representing indexing entries associated with the words g1 and g2 respectively.

Using the components shown in FIG. 1 and FIG. 2, documents are organized in a dynamic hierarchy, which is constructed on-the-fly. By presenting a dynamic directory structure, the traditional tight coupling between the sets of files and the directory structure is broken, thus allowing different users to see documents organized in a different fashion. Users establish the directory path essentially using queries to indicate what content is relevant at each point in time. A directory path is a sequence of attributes, names and values, and the contents of a directory comprise all the XML documents, which have the attributes and values, named in the path. There are two types of queries: partial and complete. A partial query is invoked in order to retrieve all possible child elements that are placed in various levels of a hierarchical virtual directory. The partial query also retrieves attributes, and actual values in the current context from the documents stored in the repository. A complete query retrieves all the documents in which a word appears within a given context. In other words, a directory path reflects a query for a set of documents matching a set of constraints. As the path is being incrementally constructed, the user of the file system browses through a set of documents that match a partial query. The user can search or browse the files by encoding queries that result in the generation of paths to the files in the repository. For example, a query may have the form, "/xmlfs/attribute1/value1/ and /attribute2/value2". This query produces a virtual directory that presents all the documents satisfying the condition "attribute1=value1 and attribute2=value2". In another example, the path "/xmlfs/attribute1/value1/ and /attribute2" corresponds to a partial query that produces a virtual directory that presents documents having any possible value of the context attributed from the files, satisfying the condition "attribute1=value1".

Figure 5A:
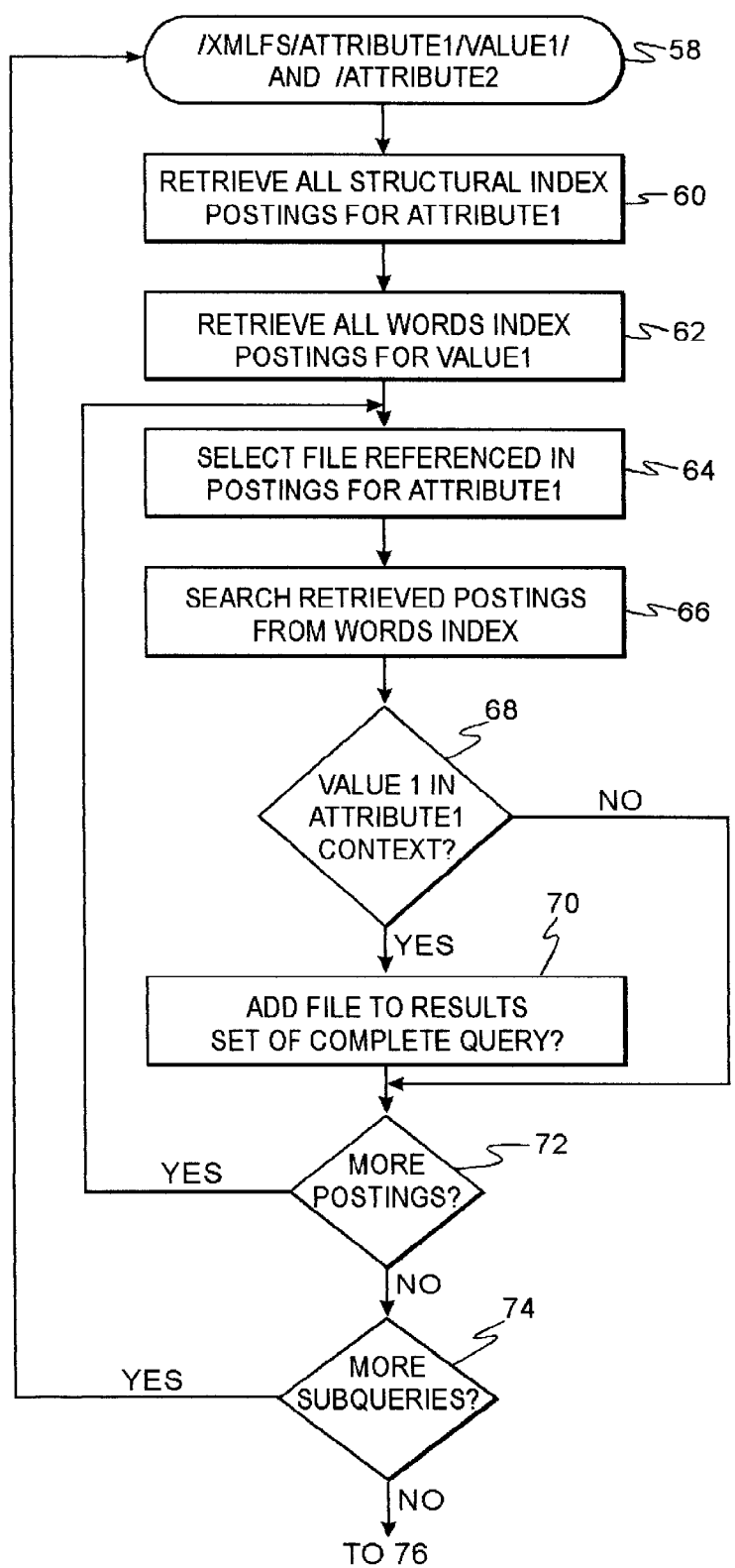
FIGS. 5A–5B, collectively referred to herein as FIG. 5, are a flow chart that illustrates the processing of queries that is employed in the file system shown in FIG. 1.
Figure 5B:
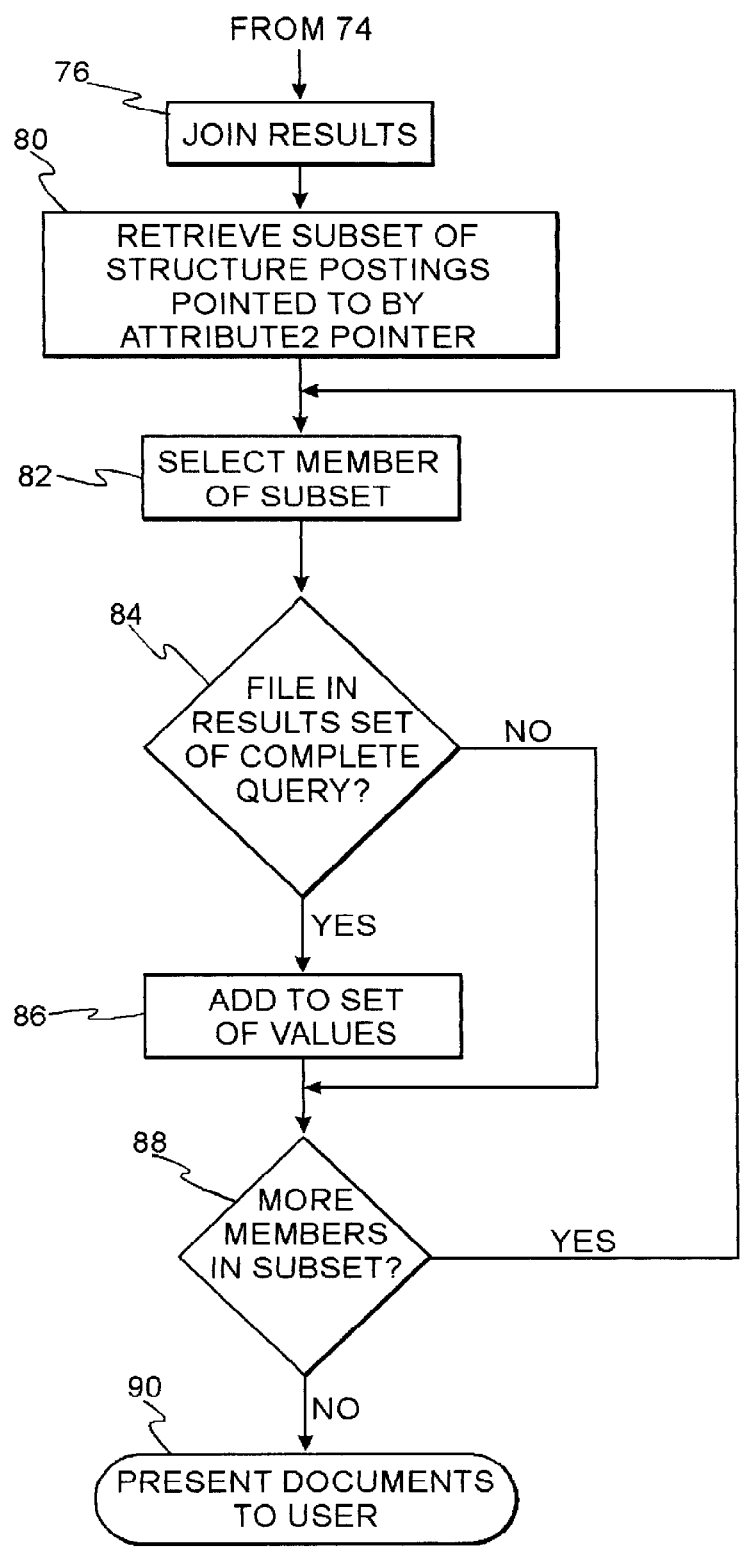

Reference is now made to FIG. 5, which presents a flow chart that illustrates query processing, and is helpful in understanding the index 28 and its components. The description of FIG. 5 is to be read in conjunction with FIGS. 1 and 2. The encoding scheme for the queries follows a rule set, which allows the file system engine 24 to recognize which type of query is being posed. A distinction is needed between a call for values and a complete query of a word within a given context.

In initial step 58, a query is stated by the user, for example, "/xmlfs/attribute1/value1/ and /attribute2". The syntax of the example is a path name. The indexer 20, operating on the index 28, must interpret the path name, and translate it into a query. In general, all items preceding the last "and" instance of a query comprise the initial portion of the query. The initial portion comprises one or more complete subqueries. The items following the last "and" instance, comprise the terminal portion of the path name. In any particular query, the terminal portion needs further analysis, since it can be a partial query or a complete query. If the terminal portion is already known in the index 28, it is interpreted as a request for values of the particular element or attribute. Otherwise, the terminal portion is interpreted as a complete subquery, in which the last element is a word being sought in the context suggested by the initial portion of the last subquery. The term "word", as used herein, is to be broadly construed. For example, a word could be a suitably demarcated alphanumeric string. Other data types could be encompassed within the term "word" as well, for example date fields, or various types of numeric fields. Next complete subqueries are performed. At step 60 all the postings 38 of the context attribute1 are retrieved from the structure index 44. Each of the postings 38 consists of a trio: an XML document identifier, the offset of the context attribute1 within the file relating to the XML document, and the entry length of the context. At step 62 a subset of the postings 40 that relate to the value value1 are extracted from the words section 32. For convenience of presentation, step 60 and step 62 are shown in sequence. However in practice both the postings 38, 40 may be processed in parallel, either as separate threads on a uniprocessor, or using a multiprocessor.

Next, an evaluation is made of the files that are referenced in the subsets of the postings 38, 40 that were retrieved in step 60 and step 62 respectively. At step 64, a file is selected from the subset of the postings 38. At step 66 a search is made in the subset of the postings 40 in order to determine if any of them refer to the file that was selected in step 64. This is done by evaluating the trio that comprises each of the postings 38, 40. If, for the XML identifier matching the file that was selected in step 64, there is at least one instance in which the offset and length entries for the attribute attribute1 in a member of the subset of the postings 38 match corresponding entries in the subset of the postings 40, then it is determined that the value value1 appears within the context attribute1. This determination is made at decision step 68.

If, at decision step 68, it was determined that the value value1 appears within the context attribute1, the file is added to the results set at step 70. Otherwise control proceeds directly to decision step 72.

All the members of the subset of the postings 38 are processed in the same manner. At decision step 72 a determination is made whether more members of the subset of the postings 38 remain to be processed. If so, then control returns to step 64.

If no more members of the subset of the postings 38 remain, then at decision step 74 it is determined if the query contains more complete subqueries. If so then control returns to initial step 58 to process another query. Otherwise, at step 76 a join operation is performed on the results set obtained in each of the subqueries. If there was only one subquery, then the join operation is omitted. Upon completion of final step 76, there is a list of files, which satisfy all subqueries in the initial portion of the query. In some applications, it may be desirable to process the subqueries in parallel.

Attention is now directed to the terminal portion of the query. In this example, the terminal portion is a partial query, which is a request for values. This is realized in step 80 by extracting another subset of postings 38 in which each member of the subset has a values pointer deriving from the attribute entry attribute2. Each pointer points to a word of the words section 32 and the file in which it appears.

All the members of the subset extracted in step 80 are next examined. At step 82, a member is selected. Then at decision step 84 it is determined if the word pointed to by the values pointer deriving from the attribute entry attribute2 corresponds to a file from the results set obtained in step 76. If so, then at step 86 the value corresponding to the member is added to a set of values to be presented to the user. Otherwise control proceeds to decision step 88.

At decision step 88 it is determined if there are more members of the subset extracted in step 80 to be evaluated. If so control returns to step 82. Otherwise, at final step 90 the set of documents developed in step 86 is presented to the user.

EXAMPLE

Reference is now made to FIG. 6, which represents a computer monitor screen display. The description of FIG. 6 is to be read in conjunction with FIGS. 1 and 2. The arrangement 10 is employed in the following example, which excerpts a session in which a user desires to identify all the companies that are listed on the stock exchange mechanism, NASDAQ, using documents that are stored in the file structure 12.

The screen display 92 represents the relevant portion of the output of the well-known Windows Explorer application of the Microsoft Windows® operating system. The entry 94 of the left panel 96 is an NFS volume that corresponds to the XML repository. The right panel 98 is an expansion of the entry 94, and displays a plurality of file folders 100. The file folders 100 are roots of a virtual hierarchical tree containing the document type declarations of the files that are currently represented in the file structure 12. A particular folder 102, entitled "profile" is one of these roots.

Reference is now made to FIG. 7, which represents a computer monitor screen display. The description of FIG. 7 is to be read in conjunction with FIG. 6. The left panel 104 of the display 106 shows the first level of the expansion of the entry 94, including the folder 102. The right panel 108 of the display 106 shows a plurality of folders 110, which are the expansion of the folder 102. The folder 102 includes the element ticker, represented by the folder 112. The display 106 displays an expanded portion of the document type declarations, which is one level deeper in the hierarchy than the screen display 92. The folder 102 has no values itself, but consists of a plurality of child elements.

Reference is now made to FIG. 8, which represents a computer monitor screen display. The description of FIG. 8 is to be read in conjunction with FIG. 6 and FIG. 7. The left panel 114 of the display 116 now shows an expansion of the folder 102, including the element ticker represented by the folder 112. The right panel 118 of the display 116 shows a plurality of folders 120, which are the expansion of the folder 112, including the element Nasdaq, represented by the folder 122. The display 116 thus presents the result of expanding the element ticker. The folders 120 contain files having actual values of the element /profile/ticker from the files stored in the repository. The result that is presented to the user is derived from all values subsumed below the element ticker satisfying the query.

Reference is now made to FIG. 9, which represents a computer monitor screen display. The description of FIG. 9 is to be read in conjunction with FIG. 6, FIG. 7, and FIG. 8. The left panel 124 of the display 126 shows an expansion of the folder 112, including the folder 122. The right panel 128 of the display 126 shows a plurality of documents 130, which are the expansion of the folder 122, including the document 132. The display 126 thus presents the result of expanding the element Nasdaq. In the right panel 128, the user is presented with all the files which have the word nasdaq in the context /profile/ticker.

Reference is now made to FIG. 10, which represents a computer monitor screen display. The description of FIG. 10 is to be read in conjunction with FIGS. 6, 7, 8, and 9. The display 134 comprises a portion of the text of the document 132, and includes the string 136, having the value Nasdaq. The display 134 is a particular example of a document satisfying the user's query, which can be quickly accessed using the Windows Explorer application of the Microsoft Windows® operating system. A new information organization paradigm has herein been disclosed, which is semantic rather than physical. Documents are presented to the user, not according to their real physical path, but rather in a context sensitive manner, which attempts to present the user with the relevant information at each moment in time. Thus, an associative access to content is established. This solution to the problem of information management allows users to remain within a familiar working application environment, rather than requiring mastery and separate use of yet another information management tool. The user is provided with information, which is always organized according to his current needs. The organization of the information is dynamic, in that document updates are immediately integrated into the hierarchical views presented to the user.

While this invention has been explained with reference to the structure disclosed herein, it is not confined to the details set forth, and this application is intended to cover any modifications and changes as may come within the scope of the following claims:

What is claimed is:

1. A computer implemented method of information retrieval, comprising the steps of:

retrieving structural information of memorized documents according to a document type declaration that corresponds to each of said documents;

retrieving elements, attributes and values of said elements and said attributes of said documents;

generating a multilevel inverted index from said structural information, said elements, said attributes and said values;

accepting a specification from a user having members that comprise at least one of said elements, said attributes and said values;

responsive to said specification, extracting data from said index that complies with at least one of said members;

displaying a hierarchy of virtual directory paths of files in a file system, said files corresponding to ones of said documents, wherein said directory paths each comprise a sequence of said members, and wherein contents of directories that are identified in said directory paths comprise selected ones of said documents possessing said specification;

responsive to said step of displaying a hierarchy of virtual directory paths, navigating said hierarchy; and browsing among said documents.

2. The method according to claim 1, wherein said index comprises a structural section having postings of said structural information, and a words section having postings of said values, wherein said values are words.

3. The method according to claim 2, further comprising the steps of:

extracting a document identifier from one of said postings of said values;

extracting an offset of a context from said one of said postings of said values; and extracting an entry length of said context from said one of said postings of said values.

4. The method according to claim 1, wherein said documents are XML documents.

5. The method according to claim 1, further comprising the steps of:

noting changes in a composition of a repository of said documents; and updating said index responsive to said changes.

6. The method according to claim 1, wherein said specification comprises a partial query and a complete query that are expressed as components of a path within said file system.

7. The method according to claim 1, wherein a portion of said specification is stated as a path name by the user.

8. A computer software product, comprising a computer-readable medium in which computer program instructions are stored, which instructions, when read by a computer, cause the computer to perform the steps of:

retrieving structural information of memorized documents according to a document type declaration that corresponds to each of said documents;

retrieving elements, attributes and values of said elements and said attributes of said documents;

generating a multilevel inverted index from said structural information, said elements, said attributes and said values;

accepting a specification from a user having members that comprise at least one of said elements, said attributes and said values;

responsive to said specification, extracting data from said index that complies with at least one of said members;

associating said data with corresponding ones of said documents;

displaying said corresponding ones of said documents as a hierarchy of virtual directory paths of a file system, wherein said directory paths each comprise a sequence of said members, and wherein contents of directories that are identified in said directory paths comprise files containing selected ones of said documents possessing said specification;

responsive to said step of displaying, navigating said hierarchy; and browsing among said documents.

9. The computer software product according to claim 8, wherein said index comprises a structural section having postings of said structural information, and a words section having postings of said values, wherein said values are words.

10. The computer software product according to claim 9, further comprising the steps of:

extracting a document identifier from one of said postings of said values;

extracting an offset of a context from said one of said postings of said values; and extracting an entry length of said context from said one of said postings of said values.

11. The computer software product according to claim 8, wherein said documents are XML documents.

12. The computer software product according to claim 8, further comprising the steps of:

noting changes in a composition of a repository of said documents; and updating said index responsive to said changes.

13. The computer software product according to claim 8, wherein said specification comprises a partial query and a complete query, that are expressed as components of a path within said file system.

14. The computer software product according to claim 8, wherein said specification is stated as a path name by the user.

15. The computer software product according to claim 8, wherein said specification is issued via a file system applications programming interface.

16. The computer software product according to claim 15, wherein said instructions define a file system engine that issues calls to an operating system.

17. A computer implemented information retrieval system for presenting a semantically dependent directory structure of XML files to a user, comprising:

a file system engine, that receives a file request via a file system application programming interface and issues file system calls to an operating system, wherein said file request specifies a file content of memorized files in a file system;

an XML parser, linked to said file system engine, that retrieves structural information of XML documents, said XML parser further retrieving at least one of elements, attributes and respective values thereof from said XML documents;

an indexer, linked to said XML parser, for constructing an inverted index of said elements and said attributes and said respective values thereof, wherein responsive to said file request, said file system engine retrieves postings of said inverted index that satisfy requirements of said file request, and returns directory paths to said file system application programming interface of said files containing said XML documents corresponding to said postings; and a browser for displaying said directory paths and said files as a navigable hierarchical display that is constructed on-the-fly by said file system engine.

18. The information retrieval system of claim 17, wherein said inverted index comprises a structural section having postings of said structural information, and a words section having postings of words of said XML documents.

19. The information retrieval system of claim 18, wherein said postings of said structural information and said postings of words comprise:

a document identifier of one of said XML documents;

an offset of a context of said one XML document; and an entry length of said context of said one XML document.

20. The information retrieval system of claim 17, further comprising an XML analyzer for updating said inverted index, wherein said XML analyzer analyzes additions to said memorized files.

21. The information retrieval system of claim 17, wherein said XML parser retrieves said structural information from document type declarations of said XML documents.

22. The information retrieval system of claim 17, wherein said file request comprises a partial query and a complete query, that are expressed as components of a path within said file system.

23. The information retrieval system of claim 17, wherein a portion of said file request is a path name.

24. The information retrieval system of claim 17, wherein a repository of said XML documents is a networked file system.

25. A computer implemented method of information retrieval, comprising the steps of:

retrieving structural information of memorized documents according to a document type declaration that corresponds to each of said documents, wherein said documents are written in a markup language;

retrieving elements, attributes and values of said elements and said attributes of said documents;

generating a multilevel inverted index from said structural information, said elements, said attributes and said values;

accepting a specification from a user having members that comprise at least one of said elements, said attributes and said values;

responsive to said specification, extracting data from said index that complies with at least one of said members;

displaying a hierarchy of virtual directory paths in a file system, files containing corresponding ones of said documents, wherein said directory paths each comprise a sequence of said members, and wherein contents of directories that are identified in said directory paths comprise selected ones of said documents possessing said specification;

responsive to said step of displaying a hierarchy of virtual directory paths, navigating said hierarchy; and browsing among said documents.

26. The method according to claim 25, wherein said index comprises a structural section having postings of said structural information, and a words section having postings of said values, wherein said values are words.

27. The method according to claim 26, further comprising the steps of:

extracting a document identifier from one of said postings of said values;

extracting an offset of a context from said one of said postings of said values; and extracting an entry length of said context from said one of said postings of said values.

28. The method according to claim 25, further comprising the steps of:

noting changes in a composition of a repository of said documents; and updating said index responsive to said changes.

29. The method according to claim 25, wherein said specification comprises a partial query and a complete query, that are expressed as components of a path within said file system.

30. The method according to claim 25, wherein a portion of said specification is stated as a path name by the user.

31. A computer software product, comprising a computer-readable medium in which computer program instructions are stored, which instructions, when read by a computer, cause the computer to perform the steps of:

retrieving structural information of memorized documents according to a document type declaration that corresponds to each of said documents; wherein said documents are written in a markup language;

retrieving elements, attributes and values of said elements and said attributes of said documents;

generating a multilevel inverted index from said structural information, said elements, said attributes and said values;

accepting a specification from a user having members that comprise at least one of said elements, said attributes and said values;

responsive to said specification, extracting data from said index that complies with at least one of said members;

associating said data with corresponding ones of said documents;

displaying a hierarchy of virtual directory paths of a file system, wherein said directory paths each comprise a sequence of said members, and wherein files in directories that are identified in said directory paths comprise selected ones of said documents possessing said specification;

responsive to said step of displaying, navigating said hierarchy; and browsing among said documents.

32. The computer software product according to claim 31, wherein said index comprises a structural section having postings of said structural information, and a words section having postings of said values, wherein said values are words.

33. The computer software product according to claim 32, further comprising the steps of:

extracting a document identifier from one of said postings of said values;

extracting an offset of a context from said one of said postings of said values; and extracting an entry length of said context from said one of said postings of said values.

34. The computer software product according to claim 31, wherein said documents are XML documents.

35. The computer software product according to claim 31, further comprising the steps of:

noting changes in a composition of a repository of said documents; and updating said index responsive to said changes.

36. The computer software product according to claim 31, wherein said specification comprises a partial query and a complete query, that are expressed as components of a path within said file system.

37. The computer software product according to claim 31, wherein said specification is stated as a path name by the user.

38. The computer software product according to claim 31, wherein said specification is issued via a file system applications programming interface.

39. The computer software product according to claim 38, wherein said instructions define a file system engine that issues calls to an operating system.

40. A computer implemented information retrieval system for presenting a semantically dependent directory structure of document files to a user, wherein documents of said document files are written in a markup language, comprising:

a file system engine, that receives a file request via a file system application programming interface and issues file system calls to an operating system, wherein said file request specifies a file content of memorized files;

a parser of said markup language, linked to said file system engine, that retrieves structural information of said documents, said parser further retrieving at least one of elements, attributes and respective values thereof from said documents;

an indexer, linked to said parser, for constructing an inverted index of said elements and said attributes and said respective values thereof, wherein responsive to said file request, said file system engine retrieves postings of said inverted index that satisfy requirements of said file request, and returns directory paths to selected ones of said document files corresponding to said postings; and a browser for displaying said directory paths and said document files as a navigable hierarchical display that is constructed on-the-fly by said file system engine.

41. The information retrieval system of claim 40, wherein said inverted index comprises a structural section having postings of said structural information, and a words section having postings of words of said documents.

42. The information retrieval system of claim 41, wherein said postings of said structural information and said postings of words comprise:

a document identifier of one of said documents;

an offset of a context of said one document; and an entry length of said context of said one document.

43. The information retrieval system of claim 40, further comprising an analyzer for updating said inverted index, wherein said analyzer analyzes additions to said memorized files.

44. The information retrieval system of claim 40, wherein said parser retrieves said structural information from document type declarations of said documents.

45. The information retrieval system of claim 40, wherein said file request comprises a partial query and a complete query, that are expressed as components of a path within said file system.

46. The information retrieval system of claim 40, wherein a portion of said file request is a path name.

47. The information retrieval system of claim 40, wherein a repository of said documents is a networked file system.

* * * * *

UNITED STATES PATENT AND TRADEMARK OFFICE
CERTIFICATE OF CORRECTION

PATENT NO. : 6,745,206 B2
DATED : June 1, 2004
INVENTOR(S) : Benjamin Mandler et al.

It is certified that error appears in the above-identified patent and that said Letters Patent is hereby corrected as shown below:

Title page,
Item [75], Inventors, delete "Yoelle Maarck-Smadja" and insert -- Yoelle Maarek-Smadja --

Signed and Sealed this

Twentieth Day of July, 2004

JON W. DUDAS
*Acting Director of the United States Patent and Trademark Office*